July 14, 1964 E. L. WITHEY 3,141,069

METHOD OF AND APPARATUS FOR RECORDING AND REPRODUCING INFORMATION

Filed April 7, 1959 3 Sheets-Sheet 1

Inventor
Edward L. Withey
by Rines and Rines
Attorneys

Inventor
Edward L. Withey
by Rines and Rines
Attorneys

July 14, 1964

E. L. WITHEY

METHOD OF AND APPARATUS FOR RECORDING AND REPRODUCING INFORMATION 3,141,069

Filed April 7, 1959

3 Sheets-Sheet 3

INVENTOR.
Edward L. Withey
BY Rines and Rines
Attorneys

United States Patent Office 3,141,069
Patented July 14, 1964

3,141,069
METHOD OF AND APPARATUS FOR RECORDING AND REPRODUCING INFORMATION
Edward L. Withey, 22 Anselm Terrace, Brighton 35, Mass.
Filed Apr. 7, 1959, Ser. No. 804,740
13 Claims. (Cl. 179—100.2)

The present invention relates to methods of and apparatus for recording and reproducing information, and, more particularly, to apparatus in which a plurality of elemental data units may be preselected and scanned to reproduce a complete message constituted of the totality of elemental data units.

Numerous types of storing and reproducing apparatus have been evolved for the purpose of reproducing preselected stored bits of information. In such systems, a desired unit of stored information system is located by selecting and positioning a pick-up device, such as, for example, a magnetic reproducing head, associated with a particular information-storage track, or tracks. Occasions arise, however, where it is desired to store discreet elemental units of intelligence or other information in a plurality of storage devices and to cause a reproducing mechanism to scan such a plurality of devices, once they have been pre-set in accordance with a preselected sequence to make up a desired message; thereby, during the scanning, to reproduce the intended message from the totality of stored elemental units of information. It may be desired, for example, to store elemental data units relating to time, so that when an apparatus is interrogated, the actual time is spoken or otherwise reproduced, as a result of the scanning of a plurality of elemental units of information, pre-set to make up the components of the time message. As another example, blind people may desire to have spoken, or otherwise indicated, a message, by scanning a plurality of individual data units pre-set to make up the desired message. The invention is not, of course, restricted to reproduction by means of the spoken word. In digital translation, for example, a number in one code may be caused to acuate apparatus to allow a number to be re-transmitted in a different code as a result of the scanning of successive units of information in this manner.

An object of the present invention, accordingly, is to provide a new and improved method of and apparatus for recording and reproduction that permits a plurality of discreet elements of information of a recorded message to be combined in any of a number of preselected ways to form complete messages that may, after preselection of a number of discreet units in the desired sequence, be scanned sequentially to reproduce the complete message.

A further object is to provide a new and improved recording and reproducing apparatus of more general utility.

Still a further object of the invention is to provide a novel magnetic recording-and-reproducing system.

Other and further objects will be explained hereinafter, and will be more particularly pointed out in connection with the appended claims.

Figure 1:
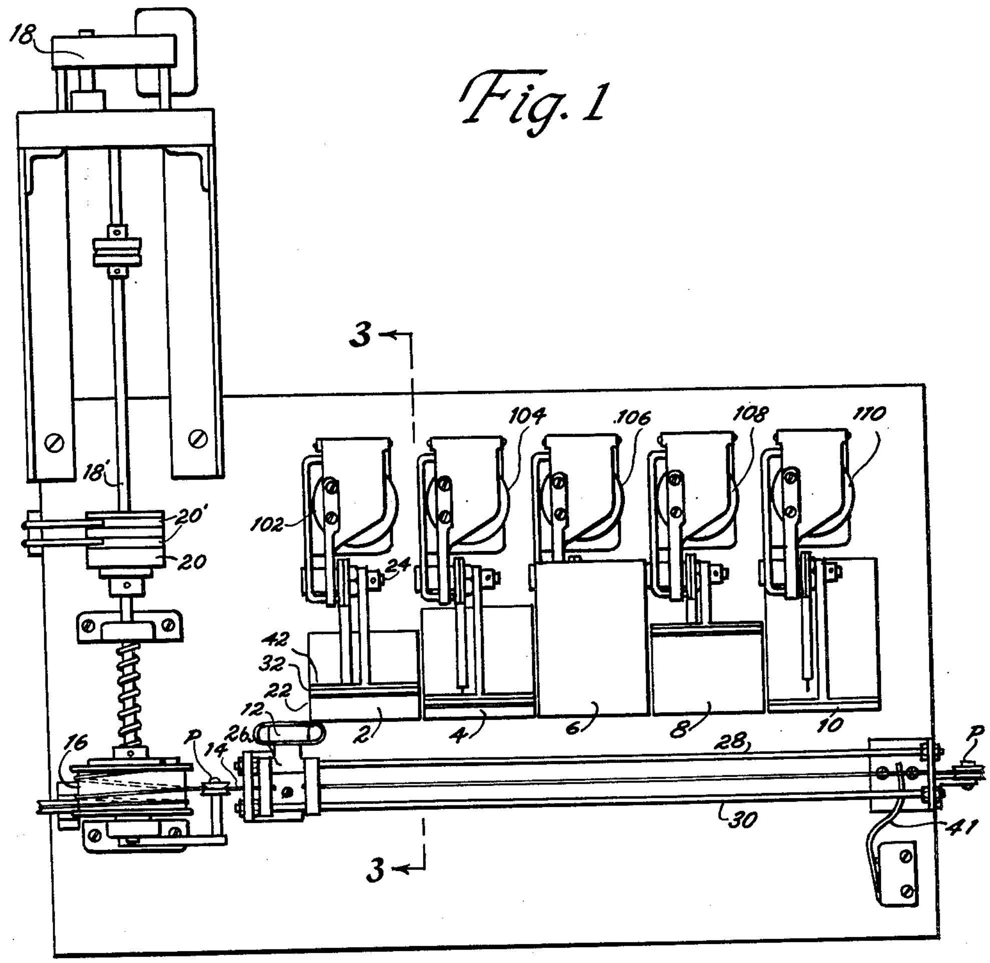
Figure 2:
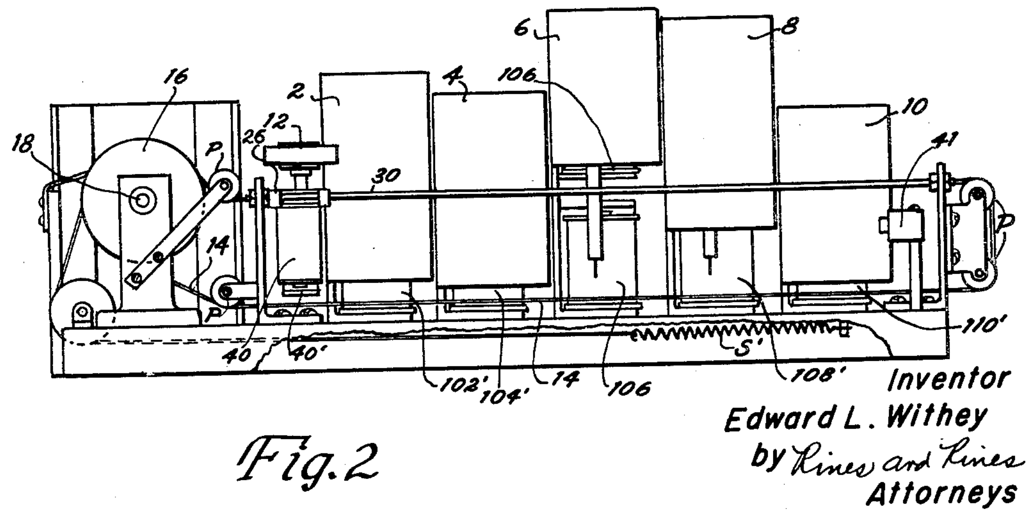
Figure 3:
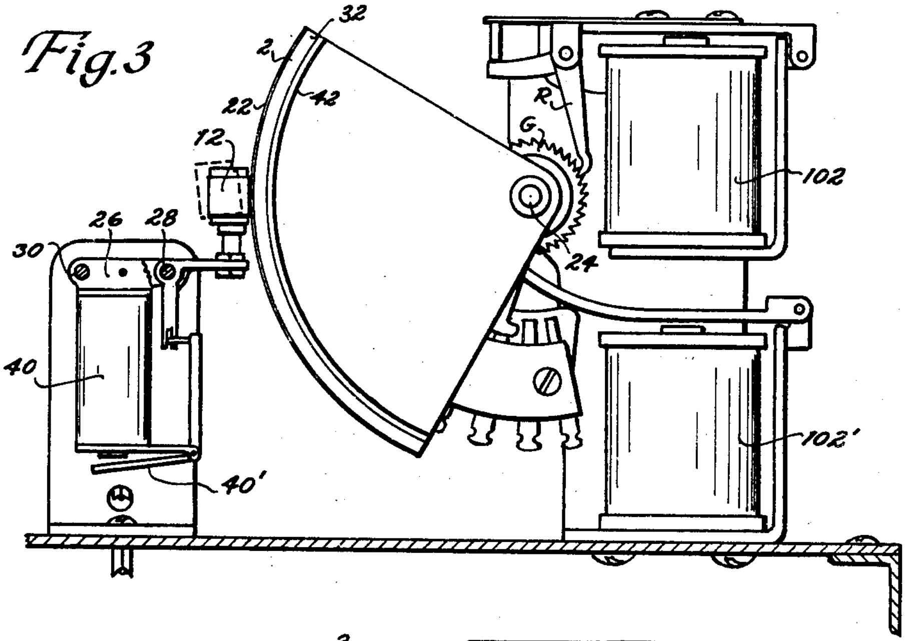
Figure 4:
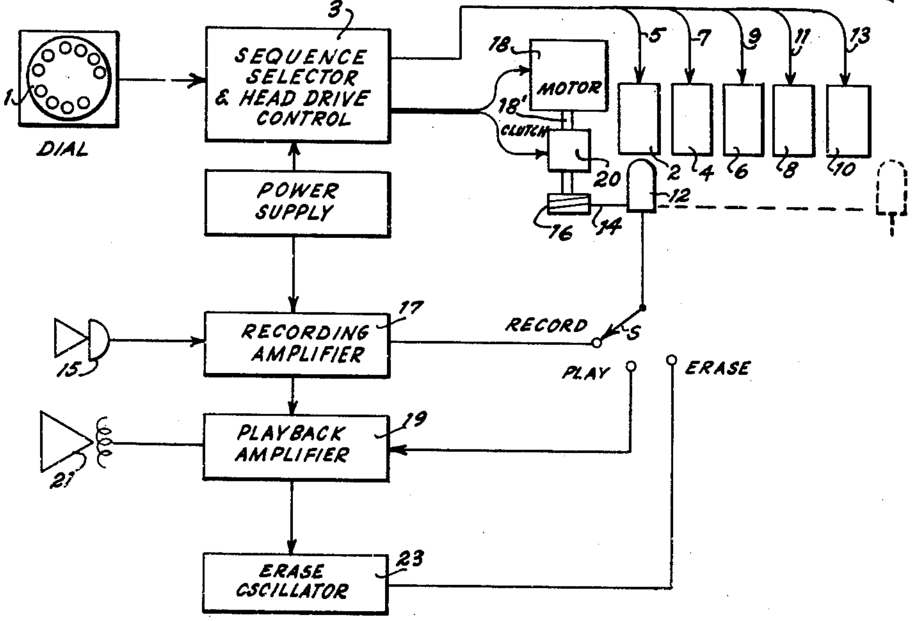
Figure 5:
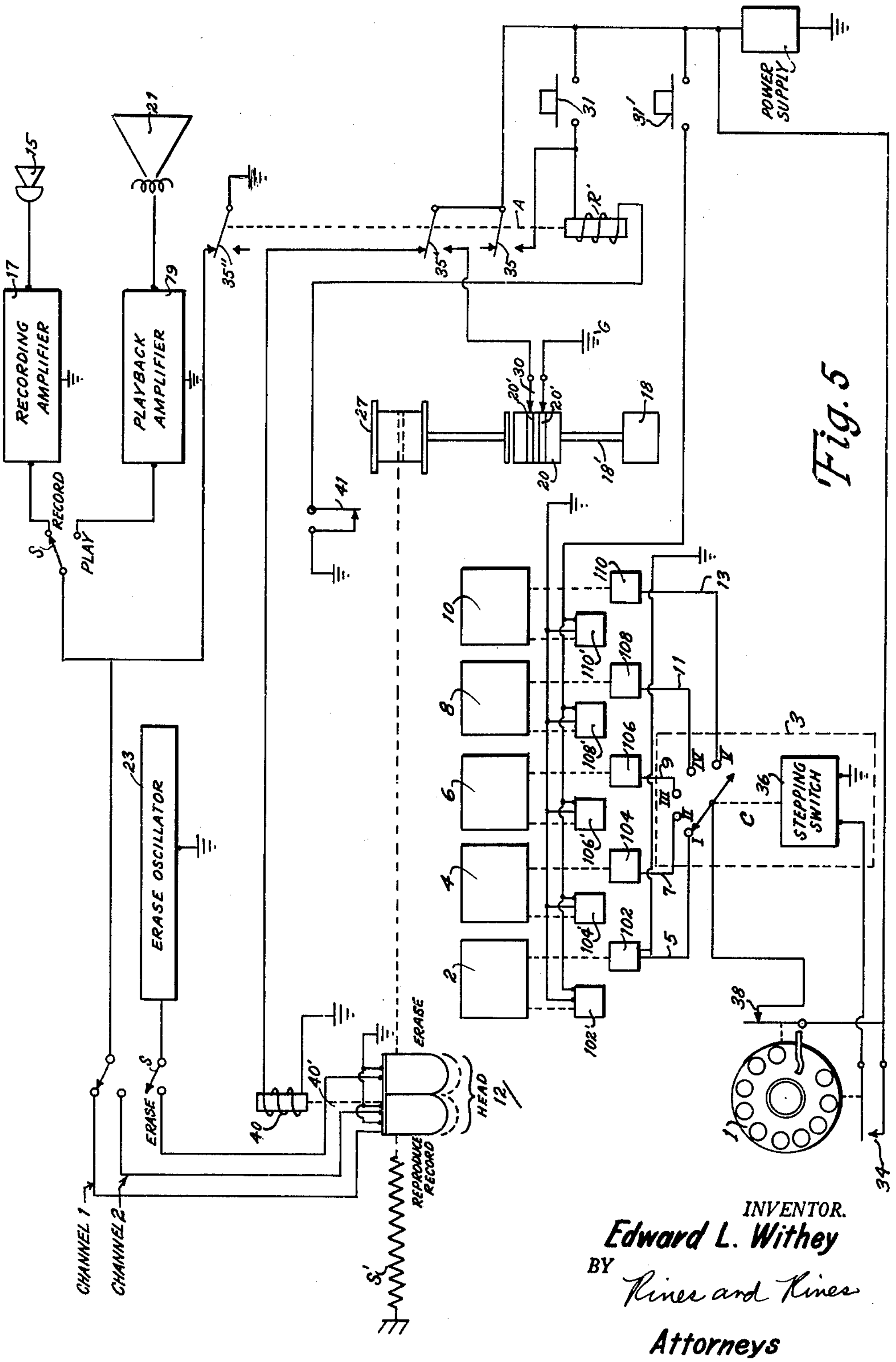

The invention will now be described in connection with the accompanying drawings, FIG. 1 of which is a top elevation illustrating an embodiment of the invention in preferred form;

FIG. 2 is a side elevation similar to FIG. 1;

FIG. 3 is a section, taken upon the line 3—3 of FIG. 1, looking in the direction of the arrows but excluding the head drive means, and drawn upon a large scale; and FIGS. 4 and 5 are block diagrams, illustrating a system in which the apparatus of FIGS. 1 through 3 may be employed.

Referring to FIG. 4, the invention is illustrated in connection with a dial 1 that is to introduce successive preselected elemental units of information, such as numbers, into the apparatus. The dial may be of the conventional telephone-dial type, as shown, but it is to be understood that while the invention is illustrated in connection with such apparatus, and in connection with units of numeral information, this is only by way of illustration, and other types of preselecting devices and other types of intelligence information, and units, may, of course, be employed, as will readily be apparent from the description to follow. The dial 1 is shown operating upon a sequence selector 3 that, through connections 5, 7, 9, 11 and 13, is shown controlling the position or setting of each of a plurality of storage devices 2, 4, 6, 8 and 10, respectively. Successive operation of the dial 1, as later explained, will cause the sequence selector 3 to set the successive storage units 2, 4, 6, 8 and 10, physically to different positions relative to a reproducing head 12, which may assume the form of a magnetic pick-up device of any well-known type. The head 12 is caused to scan the successive storage devices 2, 4, 6, 8, 10, etc. under the control of a cord 14 that is, in turn, drawn upon a spindle 16, under the control of a motor 18. When the sequence selector 3 has set the successive storage devices 2, 4, 6, 8, 10 to provide successive elemental units of data or information, such as successive numbers, by positioning the members 2, 4, 6, 8, 10 so that the corresponding numbers, stored thereupon, are in the line of travel of the head 12, the head-control mechanism in the system 3 may release a clutch mechanism 20, coupled at 18' to the motor 18, and thereby energize the motor 18 to cause the spindle 16 to rotate and draw the cord 14, say to the left, thereby causing the reproducing member 12 to scan the successive storage positions 10, 8, 6, 4, 2.

In the diagram of FIG. 4, the information may first be imparted to the successive storing devices 2, 4, 6, 8, 10 by, for example, feeding spoken information into microphone 15, amplifying the same in an amplifier 17, and, with a function-selector switch S is in the "Record" position, impressing the information through the head 12 at the desired positions of the storage members, as later more fully discussed. When the switch S is in the "Play" position, as the head 12 is drawn across the individual storage units that have been preselected to expose to the path of travel of the head 12 the desired recorded units of information making up the complete message, the message will be amplified in a play-back amplifier 19, and reproduced in the loud speaker 21. Again, while the recording of sound and the reproduction of the same has been described, it will immediately be evident that other types of apparatus for impressing the intelligence upon the storage members 2, 4, 6, 8, 10 may be employed, as is well known, as may other types of reproducing or indicating devices, including chart recorders, cathode-ray tubes and the like.

When it is desired to erase the data stored on the elements 2, 4, 6, 8, 10, etc., the switch S may be turned to the "Erase" position, and a superaudible or other "erase" oscillator 23, may be caused to feed an erasing signal to the head 12, thus to impress the erasing signal and to remove the data stored on the elements 2, 4, 6, 8, 10, as is also well known in the magnetic recording-and-reproducing art.

If, therefore, as an illustration, one had recorded upon each of the successive magnetic storage devices 2, 4, 6, 8, 10, the spoken numerals 0 through 9, at successive positions thereof, corresponding to the positions that the storage members are caused to occupy as a result of the operation of the sequence selector under the control of the dialing of the successive numerals on the dial 1, then the dialing of a successive set of numerals will cause the storage devices 2, 4, 6, 8, 10 to assume positions such that the sequence of dialed numbers corresponds to the sequence of recorded numbers of the portions of the successive storage members 2, 4, 6, 8, 10 that are exposed to the line of travel of the reproducing head 12. Thus, as the reproducing head 12 is caused to scan past the successive storage devices, there will be reproduced in the loud speaker 21, the spoken sequence of numbers constituting the complete message.

A practical apparatus for achieving this result is illustrated in FIG. 1, having five recording-drum surfaces 2, 4, 6, 8 and 10. As more particularly shown in FIG. 3, each of the drums, such as the storage drum 2, may comprise an outer strip 22 of magnetic tape carried upon a resilient cylindrical strip 32, as of foam rubber and the like, which, is, in turn, bonded to a cylindrical drum section 42. Each of these drum sections, such as the drum section 42, is shown pivotally mounted about a shaft 24. Each of the recording surfaces 2, 4, 6, 8 and 10 may have ten recording positions associated therewith, and each of the recording surfaces is provided with a stepping motor, shown respectively at 102, 104, 106, 108 and 110, that, as in conventional telephone-stepping operations, is caused to actuate a pawl R associated therewith, moving a toothed ratchet G to adjust the angular position of the storage recording member. The movement will be to a degree such that the portion of the storage surface 22 that it is desired to reproduce, is disposed adjacent to the line of travel of the reproducing head 12.

If, in FIG. 2 for example, the substantially 90-degree-sector storage member 2 be considered as having upon the outer drum surface 22, at each 9-degree interval therealong, the spoken numerals 0 through 9, then, for the position shown in FIG. 3, the stored numeral 3 on the surface 22 of the drum 2, will be opposite the recording head 12. In similar fashion, preselection by the dial 1 may have adjusted the storage drum surface 4 to a different position about an axis preferably coincident with the axis of rotation of the other drums, corresponding, for example, to the stored number 2. The selector motor 106 associated with the storage drum 6, on the other hand, may, in response to preselection of the dial 1, have adjusted the angular position thereof, as shown in FIGS. 1 and 2, to the number 9 position. In similar fashion, the storage drums 8 and 10 may be respectively angularly oriented to have the number 6 position and the number 1 position in line with the travel or scan path of the reproducing head 12. A scan of the reproducing head 12 from left to right in FIGS. 1 and 2 would therefore cause the reproduction of the spoken words 3, 2, 9, 6 and 1 stored on the respective drums 2, 4, 6, 8, 10, thereby reproducing at the speaker 21 the complete message stored and preselected as elemental data units of the successive storage drums 2, 4, 6, 8 and 10.

The head 12 has associated with it, also, as is conventional, an erasing coil placed in close proximity thereto, more particularly shown in FIG. 5, to perform the erasing function when desired, as before explained. The head 12 is shown carried by a carriage 26 that is moved along guide rods 28 and 30 in response to the drawing of the cable 14 upon the driving drum 16. The driving drum 16 is driven by the motor 18, as later more fully explained. A release mechanism, such as the lower relay-control mechanism 102' of FIG. 3, is associated with each of the storage drums, to return the same to a predetermined reference position after the scanning sequence is completed. Tensioning of the cord 14 may be achieved by means of the spring S', shown carried below the chassis of the apparatus in FIG. 2.

A more detailed explanation of the exact operation and circuit connections may be had by referring to FIG. 5. When the first number, such as the before-mentioned number 3, is dialed upon the dial 1, the dial "off-normal contacts" 34 becomes closed, as is well known, cocking the conventional stepping switch used in telephony, illustrated at 36. As the dial 1 is released, the dial pulse contact 38 delivers three pulses through a commutator C, a switch contact position I, and conductor 5, to the stepping motor magnet 102 associated with the storage drum 2. This causes the operation of the panel R thereof to move the storage drum 2 radially about the shaft 24 to a position where the stored spoken number 3 is opposite the line of travel of the reproducing head 12. When the dial 1 returns to normal, contacts 34 reopen, allowing the stepping switch 16, as in conventional telephony, to advance to the second position II. When the second number is dialed, such as the before-mentioned number 2, contacts 38 deliver two pulses through the commutator C, which is now in contact with the switch position II, advancing the magnetic surface 4 to the 2-position in line with the scan path of the head 12 as result of the operation of the stepping motor relay 104 associated with the recording drum 4. In similar manner, each of the successive storage drums 6, 8, 10 will be operated to a preselected position by the respective stepping motor members 106, 108, 110 to place in the line of path of the scanning reproducing head 12, the preselected intelligence to be reproduced as a complete message by such scan.

With the five recording surfaces 2, 4, 6, 8, 10 thus in the preselected positions, a start button 31 may be depressed effecting the closing of a relay R' that locks through the resulting closure of a switch contact member 35 associated with the armature A of the relay R'. A further contact 35' also associated with the armature A becomes similarly operated to the down or closed position, causing the before-mentioned clutch 20 (which may be of the magnetic type) to become closed through a circuit traceable through slip rings 20', connected between the lower contactor for the switch 35' and the ground terminal G. The closure of contact 35' to the lower contact position also serves to de-energize and de-actuate a magnetic actuator 40, the lower terminal of which is also shown connected to ground. This permits the head 12 to move adjacent the storage drums, as shown in solid lines in FIG. 3, the reproducing head being thus substantially in the plane of the preselected portions of the magnetic drum surfaces 2, 4, 6, 8, 10. Cable 41 is now rotated through the actuation of the motor 18. The cable 41 will pull the head assembly 12 with substantially constant velocity across the successive magnetic storage surfaces 2, 4, 6, 8, 10, allowing the recording or play-back of information in the five selected positions thereof.

When the head assembly 12 has passed the last surface 10, it opens a normally closed limit switch 41, shown in FIG. 5 and at the right-hand side in FIGS. 1 and 2, opening the relay R' and restoring the switches 35, 35' to the original positions shown in FIG. 5. When contact 35' thus becomes open, it releases the magnetic switch 20 and energizes the coil of an actuator (relay) 40. When thus energized, the coil 40 pivots back against the magnetic seating member 40', rocking the head 12 away from the plane of the preselected positions of the magnetic storage devices 2, 4, 6, 8, 10, as shown dotted in FIG. 3. As soon as the clutch 20 thus opens, the before-mentioned spring S', FIGS. 2 and 5, rapidly returns the head 12 to the left, to the initial position illustrated in FIGS. 1 and 2. This prevents the heads 12 from contacting the magnetic surfaces during this comparatively rapid return cycle, and thus prevents possible damage to the storage surfaces. A further contact 35'' carried by the armature A of the relay R' serves as a contact to ground so that the play-back amplifier 19 has its input circuit grounded during the return and stand-by periods, thereby preventing extraneous noises from reaching the speaker 21. When a re-set button 31' is depressed, the re-set magnets 102', 104', 106', 108' and 110' become actuated, returning the five storage surfaces 2, 4, 6, 8, 10, respectively, to their initial or reference positions. The system is now ready for re-cycling. The preselected message can, of course, if desired, be played an indefinite number of times before this re-setting operation.

While, for simplicity, the above description has been restricted to but five surfaces 2, 4, 6, 8, 10, each having ten positions and a re-set position, it may be observed that more or less than five surfaces can obviously be employed, and that each may have a number of recording positions far greater or even less than the number ten selected for illustrative purposes. The use of a multiple channel head 12, moreover, such as the two-channel arrangement of FIG. 5, would multiply the choice of the message for each selected set of positions, where multiple-head recording instead of a single-head recording would be achieved. While, for purposes of illustration, the selection of the recording positions was made serially, that is, sequentially in time, by means of a stepping distributor 16, stepping actuators, such as minor switches that have electrical contacts associated with each position, may be employed to drive the magnetic surfaces. These contacts may, moreover, be operated in parallel to permit simultaneous selection of recording positions, if desired, as is well known in the switching art. Other types of storage surfaces may, of course, obviously be employed.

While the details of the construction and circuit connections of the stepping and re-setting motors or relays are not fully illustrated, though they are fully schematically presented in the diagram of FIG. 5, this is because these details are not essential to an understanding of the principles of the present invention, they being fully well known in the telephone and related arts. They are omitted herein so as not to confuse the disclosure or to detract from the pointing out of the actual features of invention. The stepping switch motor devices and re-set relays 102, 102' and associated circuitry may, for example, be of the well-known conventional type, marketed by C. P. Clare & Company of Chicago; such as the types 20, 26, 40 or 52 manufactured by that company.

Further modifications will occur to those skilled in the art and all such are considered to fall within the spirit and scope of the invention, as defined in the appended claims.

What is claimed is:

1. In combination, a plurality of separate intelligence-storage devices arranged in juxtaposed substantially continuous succession along a scanning path, each device having magnetic material provided with a plurality of spaced magnetic intelligence-storage tracks extending across the device in the direction of said path, means for selectively moving each of said devices separately from the other deviecs to any one of a plurality of predetermined positions at each of which a selected one of its tracks is aligned with said path and juxtaposed with a track of a succeeding device, magnetic pick-up means, means for moving said pick-up means along said path in proximity with said juxtaposed tracks, and means coupled to said pick-up means for reproducing substantially continuously the intelligence stored in said juxtaposed tracks.

2. The combination of claim 1, said tracks being equally spaced along the associated device.

3. The combination of claim 1, further comprising means movable along said scanning path for magnetically recording intelligence in said tracks.

4. The combination of claim 1, further comprising means movable along said scanning path for erasing the intelligence stored in said tracks.

5. The combination of claim 1, further comprising acoustic transducer means for converting acoustic voice signals to electric signals and means for recording said electric signals in said tracks.

6. The combination of claim 1, said means for moving said pick-up means comprising means for rapidly returning said pick-up means to an initial position, and means for re-setting said inteligence-storage devices to an initial position.

7. The combination of claim 6, said re-setting means comprising release relays.

8. The combination of claim 7, said means for moving said pick-up means having means for positioning said pick-up means away from said intelligence-storage devices during the return of said pick-up means to said initial position.

9. In combination, a plurality of separate cylindrical drum members having a common axis of curvature and arranged in juxtaposed succession along a scanning path parallel to said axis, each of said drum members having a layer of magnetic material extending over its cylindrical surface, means for selectively moving each of said members about said axis separately from the other members to any one of a plurality of successive predetermined positions, at each of which a different portion of said magnetic material is aligned with said scanning path, magnetic pick-up means, and means for moving said pick-up means along said scanning path past said members in succession.

10. The combination of claim 9, further comprising means movable along said scanning path for recording at each of said portions of magnetic material a message portion extending parallel to said axis.

11. The combination of claim 10, said recording means comprising acoustic transducer means for converting acoustic voice signals to electric signals.

12. The combination of claim 10, further comprising means movable along said scanning path for erasing said message portions.

13. The combination of claim 9, said means for moving said members comprising stepping motors.

References Cited in the file of this patent

UNITED STATES PATENTS

| | | |
|---|---|---|
| 2,328,304 | Sorensen | Aug. 31, 1943 |
| 2,374,537 | Goldsmith | Apr. 24, 1945 |
| 2,648,589 | Hickman | Aug. 11, 1953 |
| 2,719,965 | Person | Oct. 4, 1955 |
| 2,832,841 | Eldridge | Apr. 29, 1958 |
| 2,855,585 | Quinby | Oct. 7, 1958 |
| 2,892,040 | Johnson | June 23, 1959 |